United States Patent [19]
Schinzing et al.

[11] Patent Number: 5,133,375
[45] Date of Patent: Jul. 28, 1992

[54] WHEELCHAIR WASHER APPARATUS

[76] Inventors: Walter W. Schinzing, 1932 Gervais, Maplewood, Minn. 55109; Dallas W. Foster, 509 E. Iowa St.; Gale L. Brinkman, 509 N. High St., both of Green, Iowa 50636; Michael M. Meissen, R.R. 1 Box 47, Clarksville, Iowa 50619

[21] Appl. No.: 612,757
[22] Filed: Nov. 14, 1990
[51] Int. Cl.⁵ .............................................. B08B 3/02
[52] U.S. Cl. .................................. 134/123; 134/144; 134/180
[58] Field of Search ............... 134/113, 123, 144, 172, 134/179, 180, 181

[56] References Cited

U.S. PATENT DOCUMENTS 2,744,532  5/1956  Zademach ........................ 134/179
2,936,770  5/1960  Emanuel ........................ 134/179 X
3,289,238  12/1966  Sorenson et al. ................ 134/123 X
3,444,867  5/1969  Thornton ............................ 134/123

FOREIGN PATENT DOCUMENTS 0041087  12/1981  European Pat. Off. ............ 134/123

Primary Examiner—Philip R. Coe
Attorney, Agent, or Firm—Jacobson and Johnson

[57] ABSTRACT

A washer for a conventional wheelchair has a washing chamber within an enclosure with fluid-driven rotatable washer arms having suitably angles nozzles for directing cleaning and rinsing fluids onto a wheelchair mounted on a slidable rack just above the slanted drain floor of the enclosure. The device also provides for rotating the large side support wheels during the washing cycles while keeping the chair from moving.

2 Claims, 8 Drawing Sheets

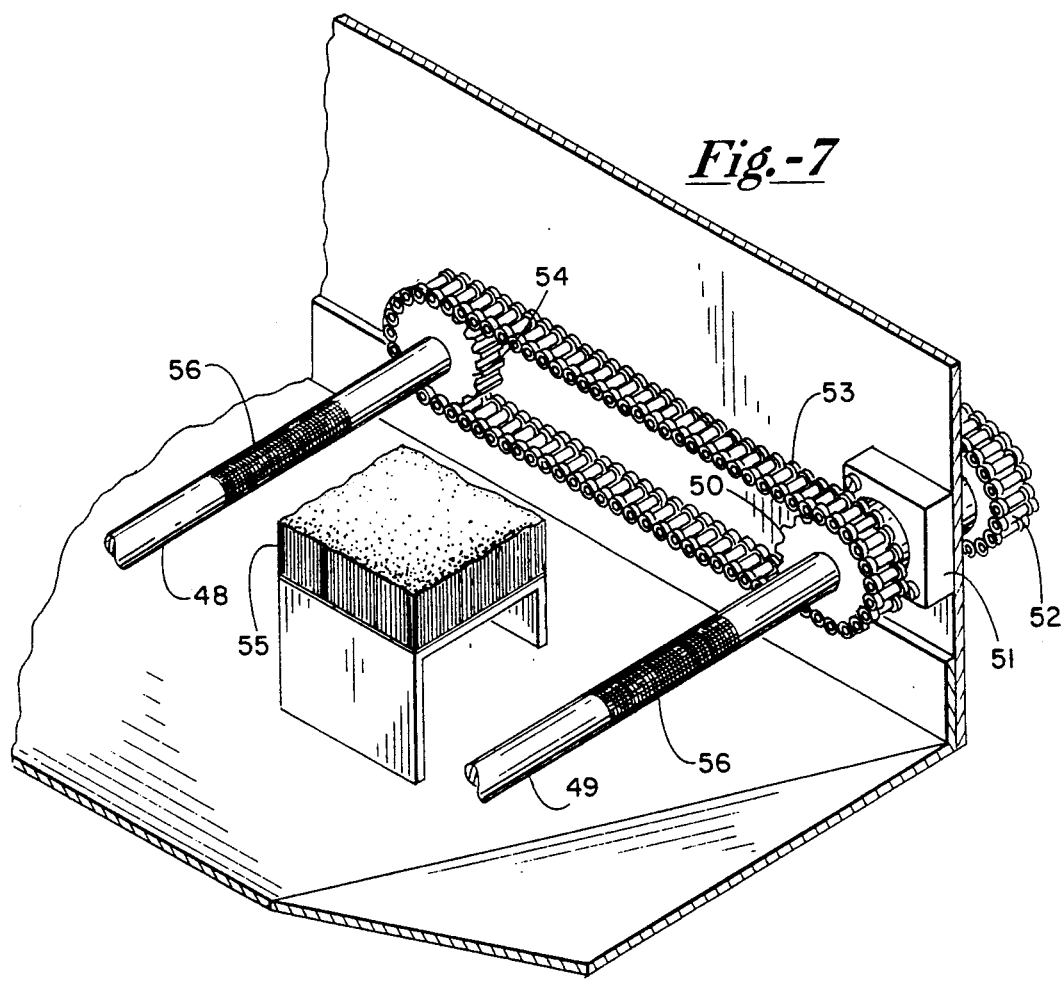

WHEELCHAIR WASHER APPARATUS

BACKGROUND OF THE INVENTION

This invention is a machine specifically designed for cleaning and washing conventional wheelchairs.

Maintaining wheelchairs clean and sanitary whether by institutions such as hospitals or nursing homes or by individuals at their own residences has been difficult. Machines for washing and sanitizing hospital carts have been available. Typically, for example, U.S. Pat. No. 3,736,948 by Crosswhite describes a washer and sanitizer for a hospital laundry cart. U.S. Pat. No. 3,096,775 by Clarke, et al. describes an apparatus for washing carts used in hospitals or other institutions for carrying food or medications. U.S. Pat. No. 4,408,625 by Kuhl describes a washing apparatus for similar carts which may be used, for example, in bakeries, hatcheries, meat processing operations, etc. U.S. Pat. No. 3,179,117 by Gibson, et al. describes a machine for washing grocery carts.

The aforementioned prior art patents all show and describe a washing chamber within an enclosure, suitably oriented spray nozzles for applying cleaning and/or sanitizing fluid to the article to be cleaned, tapered or slanted floors for draining to a sump, sources of cleaning and/or sanitizing fluids, pumps, controls and piping or conduits for feeding the fluids into the chamber and applying them through spray nozzles to the article being cleaned, and a ramp for wheeling the cart or the like into the washing chamber. The '948 patent provides a motor-driven rotating washer arm and the '625 patent provides a mechanism for moving the article being cleaned back and forth within the chamber during the washing and rinsing operations.

SUMMARY OF THE INVENTION

The wheelchair washer of the present invention has many things or components in common with the prior art. It has a washing chamber defined by an enclosure having side walls, a ceiling and a floor and a doorway through which the wheelchair can be placed into and removed from the washing chamber. It has sources of cleaning and sanitizing fluids, means for draining the fluid through a sump in a slanted drain floor, piping or conduits for carrying the fluid to nozzles for spraying the fluids onto the wheelchair and for removing the fluids from the chamber, and a pump for pumping the fluids into and out of the washing chamber. In addition, it has suitable timing and sequence controls. One feature of the instant invention is that the fluids or liquids are applied to the wheelchair within the chamber by rotating washer arms located on the interior walls of the enclosure. The washer arms are constructed and mounted to be rotated by the water pressure instead of requiring a separate drive motor. In addition, the washer arms have a series of spray nozzles which are angled so that in combination with the proper placement of the washer arms relative to the wheelchair all areas of the wheelchair are repeatedly impinged by the cleaning fluids in order to ensure that the cleaning is complete and thorough. Because of one of the unique characteristics of a conventional wheelchair as compared to carts, namely, having a seat or chair section, this constitutes a significant feature of the invention. Another feature arises out of the nature of the conventional wheelchair wheels which are used as the primary support for and for propelling the wheelchair. Generally the wheels on carts are only incidental in the sense that they are merely there as a convenient way of moving the cart around so that cleaning the wheels on carts is relatively unimportant. With a wheelchair the user often uses the wheels to move himself or herself around by hand and therefore it is extremely important to make sure that the wheels are cleaned thoroughly. The instant invention provides a platform above the floor of the chamber for holding the front guide wheels in place so that the wheelchair does not move while the side mounted main support wheels are being rotated as the cleaning fluid or liquid is being applied to assure a thorough cleaning of the main wheels.

In its operation, the wheelchair cleaner initially measures the amount of cleaning fluid that is fed into the cleaning chamber. When it reaches a prescribed amount or level, a pump is turned on to continually recirculate the liquid between the drain sump and the washer arms with enough pressure to rotate the washer arms and to provide the desired spray intensity and pattern from the nozzles onto the wheelchair. For efficiency, the cleaning liquid is continuously recirculated and only after the wash cycle is completed is it dumped. The initial measurement of the amount of liquid in the system is necessary in order to make sure that there is enough liquid in the system so that the pump does not cavitate.

As a further feature, the platform on which the wheelchair is mounted in the washing chamber is located with respect to the washer arms to ensure that the wheelchair is thoroughly washed.

As yet another feature, the wheelchair washer apparatus can be operated to use the rinse water or fluid from one wash as part of the washing fluid for the next wash thereby further conserving water.

BRIEF DESCRIPTION OF THE DRAWINGS

FIG. 7 is a enlarged partial view of a preferred mechanism for rotating the wheelchair wheels during cleaning;

DESCRIPTION OF THE PREFERRED EMBODIMENTS

Figure 1:
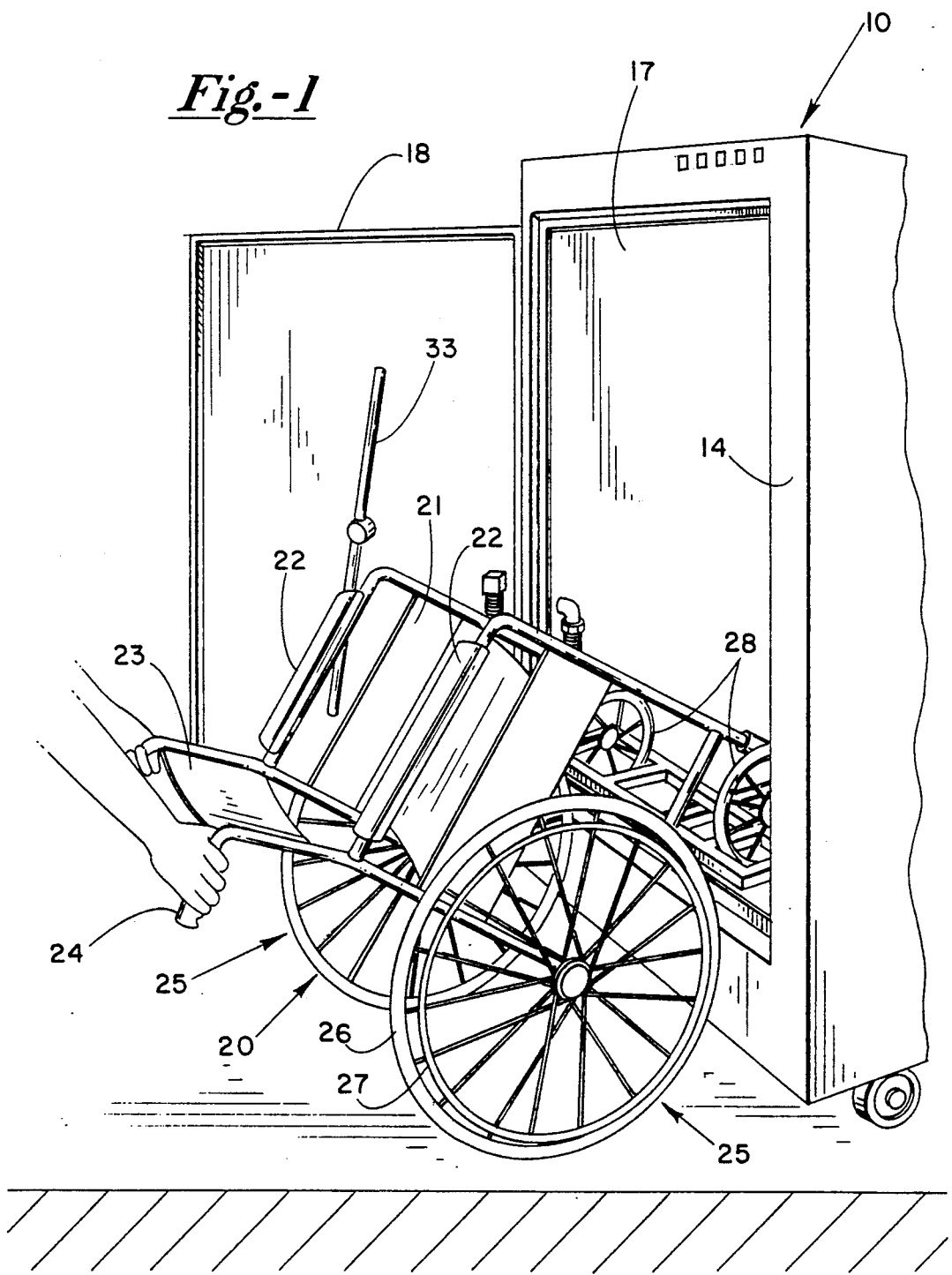
FIG. 1 is a perspective view of the doorway end of the washer illustrating the manner in which the wheelchair is placed into or removed from a preferred embodiment of the washer apparatus.

The preferred form of the wheelchair washer has a washing chamber within an enclosure, generally designated by reference numeral 10, having side walls 11 and 12, end walls 13 and 14, a ceiling 15 and an interior floor generally designated by reference numeral 16. End wall 14 has a doorway opening 17 and a swingable attached door 18 which is opened to permit a conventional wheelchair, generally designated by reference numeral 20, to be placed into or removed from the washing chamber in the manner illustrated in FIG. 1 but is closed when the washer is operating. Typically and conventionally a wheelchair 20 has a seat 21, which generally is a combination of rigid supports and fabric material, and has arm rests 22 on each side of the seat, a back support 23 with rearward extending handles 24 which are used by someone other than the wheelchair occupant to move the wheelchair around. A pair of relatively large diameter vertically disposed main support wheels 25 are mounted on shafts or axis below the seat at each side of the seat. Wheels 25 generally have tire-like rubber coverings 26 which rest on the ground or floor and a metal hoop 27 which the chair occupant can use to turn the wheels by hand to move the wheelchair. At the front of the wheelchair, also below the seat level, are a pair of relatively small diameter guide wheels 28. The wheelchair also has foot supports 29 (not shown in FIG. 1 for clarity) which extend downward and forward from the wheelchair seat.

Washer floor 16 has panels 16A which are slanted downward towards the middle of the chamber so that liquid in the chamber flows into a suitably filtered sump generally designated by reference numeral 30. Mounted on the interior of side walls 11 and 12 are rotatable, elongated, hollow, tubular washer arms 31 and 32, respectively. Mounted on the interior of door 18 is washer arm 33 and mounted overhead, either on or just below the ceiling 15, are rotatable washer arms 34 and 35. The washer arms will be described later in greater detail but for the present suffice is to point out that the washer arms have a series of spray nozzles 36 which are spaced lengthwise along the hollow tubular washer arms and are angled in a fashion to make sure that the wheelchair which is placed inside the washing chamber receives a thorough and complete impact of cleaning and rinsing fluids during operation of the machine. Pressurized fluid pumped to the washer arms causes the arms to rotate or spin while the fluid is being ejected out of the spray nozzles into the washing chamber and onto the wheelchair. Conventionally the washer has a wash cycle during which water combined with a suitable cleaning solution is applied to the wheelchair via the spray arms and nozzles and a rinse cycle during which rinse water with any suitable rinsing ingredient is applied by the washer arms to rinse off the wheelchair. Various hoses or pipes or conduits as well as controls, the pumps and containers for the cleaning and rinsing ingredients, other than water, are located outside the washing chamber end wall 13 opposite the door and are identified at this juncture collectively by reference numeral 37. Pump 38 is coupled to sump 30 via hose or conduit 39 and during the washing operation circulates the cleaning fluid, generally water mixed with a cleaning solution, between the sump 30 and the various washer arms and during the rinsing operation similarly circulates the rinsing liquid, which generally comprises water mixed with some suitable rinsing agent.

Just above floor 16 and generally centered between the side walls 11 and 12 is an elongated rigid guide track or rail 41 attached at one end to wall 13 and at the other end to wall 14 in some convenient conventional fashion.

Guide track 41 is generally U-shaped in cross-section having a slot or elongated upward facing recess 42 over its length. A generally planar rectangular rigid rack 43 has wheels or rollers, not shown, on the underside of its cross-members 44 at about their midpoint which are engaged in recess 42 of track 41 so as to rest generally horizontally and be able to glide or slide back and forth over the length of track 41 in the direction as illustrated by arrows 45 in FIG. 2. At each side end of rack 43 is a frame generally designated by reference numeral 46 having generally rectangular openings 46A. Extending between side walls 11 and 12 and passing through the lower part of track or rail 41 are a pair of parallel spaced-apart rods 48 and 49 which are suitably rotatably journalled in the side walls 11 and 12. As illustrated more clearly in FIG. 8, rod 49 is attached at one end to the center of sprocket 50 and through a suitable coupling, generally designated by reference numeral 51, to an exterior shaft attached to sheave 52 which is belt driven by an external motor, not shown. Sprocket 50 is connected by endless chain 53 to sprocket 54 which is attached to rod or shaft 48 so that shaft 48 will rotate along with shaft 49 when the latter is driven by the external motor. Located in the space between shafts 48 and 49 toward each side are scouring pads 55. Short sections of rod 49, at locations generally in line with scouring pad 55, are knurled or otherwise roughened as illustrated at 56.

As best illustrated in FIG. 1, a wheelchair 20 to be cleaned is inserted into the washing chamber by pushing downward on the handles 24 to raise the small diameter guide wheels 20 while the main large diameter wheels 25 are resting on the ground and placing each of the guide wheels 28 respectively into an opening 46A of frame 46 on rack 43. The wheelchair's main wheels 25 are then elevated off the ground by lifting the handles 24 and the chair is pushed forward so that rack 43 slides or glides along rail 41 towards wall 13 until the wheelchair is completely in the washing chamber, with wheels 25 resting on rods 48 and 49 as illustrated by dashed lines in FIG. 2. The tire section 26 of each wheel rests on a scouring brush 55 and on the knurled areas 56 of rod 49. During washing and rinsing the external motor, not shown, is energized to rotate rods 48 and 49 about their longitudinal axes so that the main large diameter propulsion wheels 25 are frictionally driven to rotate while at the same time the frame portions 46 of rack 43 engaging the front guide wheels 28 prevent the wheelchair from moving so that during the wash and rinse operations the large diameter propulsion wheels 25 are continuously rotated to ensure that they receive a thorough cleaning.

Figure 8:
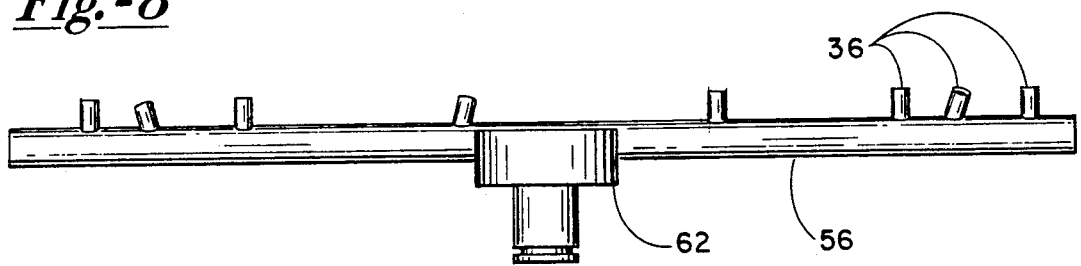
FIG. 8 is a top view of a preferred embodiment of a washer arm.
Figure 9:
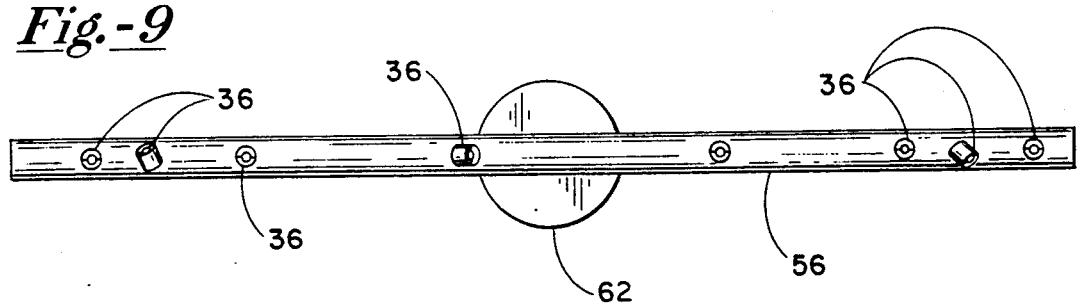
FIG. 9 is a front view of the washer arm.

Reference to FIGS. 8-11 give some of the details of the construction and operation of the washer arms. An elongated hollow cylinder or tube 56 at about its midpoint has a wall opening 57 through which the cleaning and/or rinsing fluid enters the tube 56 and flows towards both closed ends of the tube as illustrated by the arrows in FIGS. 10 and 11. Spaced along tube 56 are a series of nozzles 36. Nozzles 36 are conventional and are formed in any convenient or conventional fashion usually to provide an elliptically shaped opening and may be provided, for example, by short studs or nipples which are threaded or welded to tube 56 at locations which have openings through the tube 56 in communication with the nozzle spray openings. As illustrated in FIGS. 8 and 9, the nozzles 36 are oriented at various angles with respect to the tube 56. There is no precise formula for determining the angle of each nozzle 36 of a set of nozzles on any of the given spray arms because various factors come into play to determine the proper angular positioning of the nozzles. The biggest factor is the relative location of the washer arms to the wheelchair within the cleaning chamber. The number, location, and angular arrangement of the nozzles is generally arrived at by a cut and try method for a given location of the wheelchair to be cleaned relative to the location of the washer arms on the walls and ceiling of the wheelchair washer apparatus. For example, for a given wheelchair washer apparatus with the washer arms set at a given location, if the wheelchair were raised or lowered or tilted, then it is likely that some if not all of the nozzles on the various washer arms would have to be reoriented in order to ensure a thorough cleaning and rinsing of the wheelchair.

Figure 10:
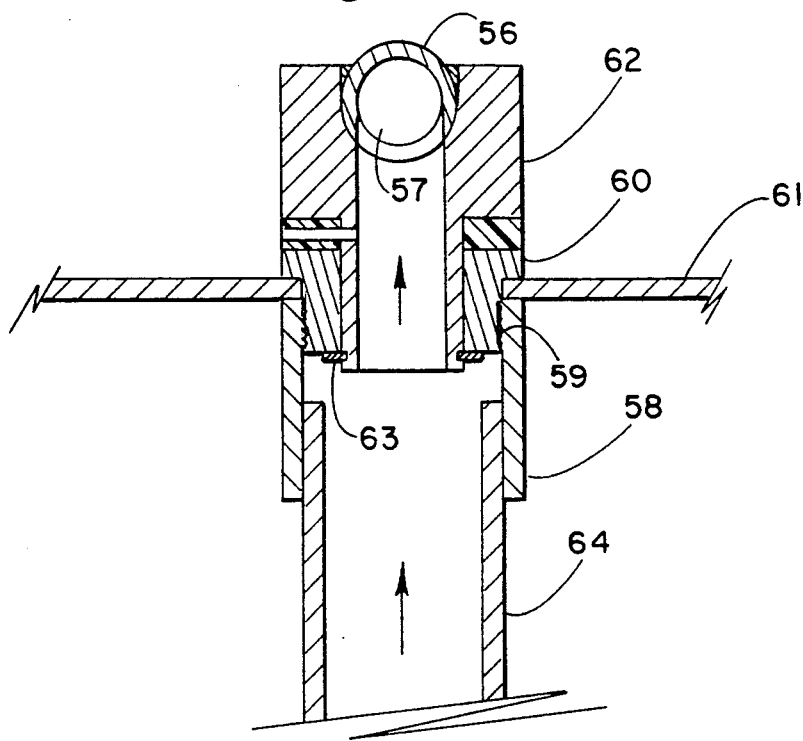
FIG. 10 is a vertical section view of a preferred embodiment of the arrangement for rotatably coupling the washer arms to the piping or the conduit which carries the fluids.
Figure 11:
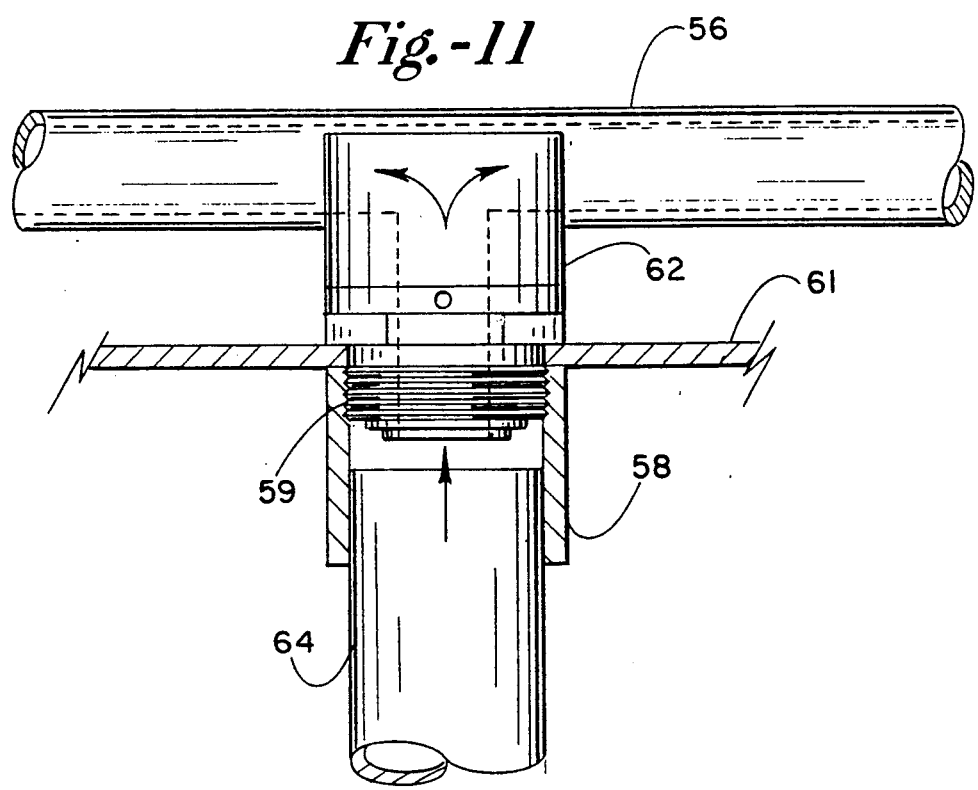
FIG. 11 is another vertical partial section of the coupling of the washer arm to the conduit.

As mentioned earlier, one of the features of the wheelchair washer apparatus is that all of the washer arms are rotatably driven by the water or fluid pressure alone, not requiring any external drive motors. A typical arrangement for rotatably mounting the spray arm to the conduit which carries the fluid is illustrated in FIGS. 10 and 11. A hollow sleeve member 58 has an internally threaded section 59 near one end and a hollow cap member 60 having external threads is threaded into sleeve 58 through a suitable opening formed in the interior wall 61 of the washer apparatus. A bushing generally designated by reference number 62 is slidably and rotatably engaged in the central opening of cap 60 and is held rotatably in place by a C-ring 63. The axial opening of the annular bushing 62 is aligned with and in communication with radial opening 57 of pipe or tube 56. At the other end of sleeve 58 a fluid-carrying conduit 64 is press-fitted or otherwise secured to the interior opening of sleeve 58 to provide fluid communication therewith. The ends of tube 56 are closed off and the pressure of the fluid being pumped into tube 56, in a fashion described earlier, together with the arrangement of the spray nozzles 36 is such that when the fluid is pumped into the spray arms, the spray arms will rotate or spin to provide a continuous moving spray pattern which is applied to the wheelchair inserted in the washing chamber. The mechanism for rotating the spray arms by the water pressure as described is not significantly unlike mechanisms of a similar nature utilized for other purposes such as lawn sprinklers. However, the nature of the design with respect to the function is such that it continuously rotates the cleaning and rinsing fluid in a manner and pattern to effect the cleaning and rinsing function unlike that in a lawn sprinkler.

Figure 2:
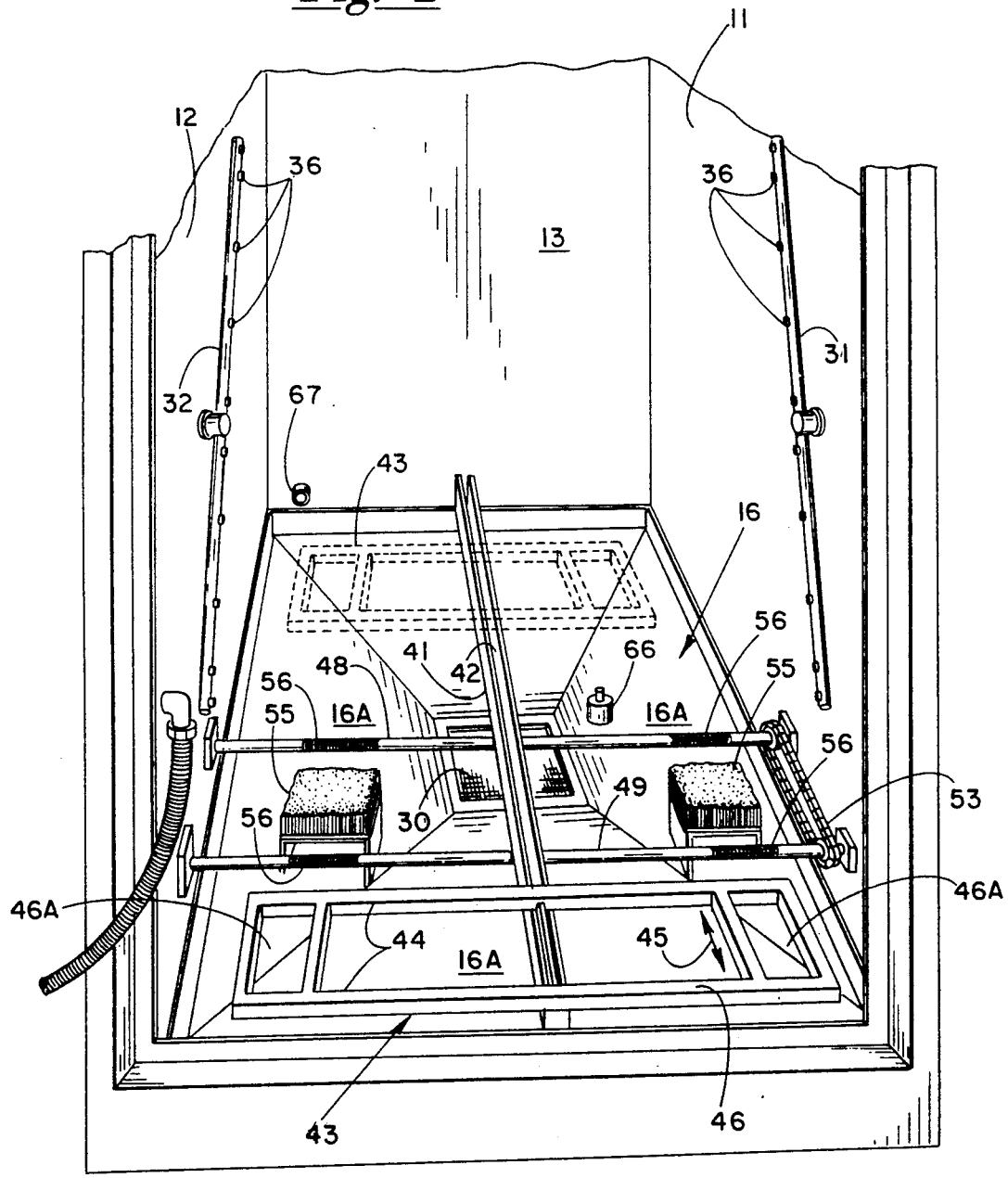
FIG. 2 is a perspective view looking at the interior floor of a preferred embodiment of the washer apparatus from the doorway end.
Figure 3:
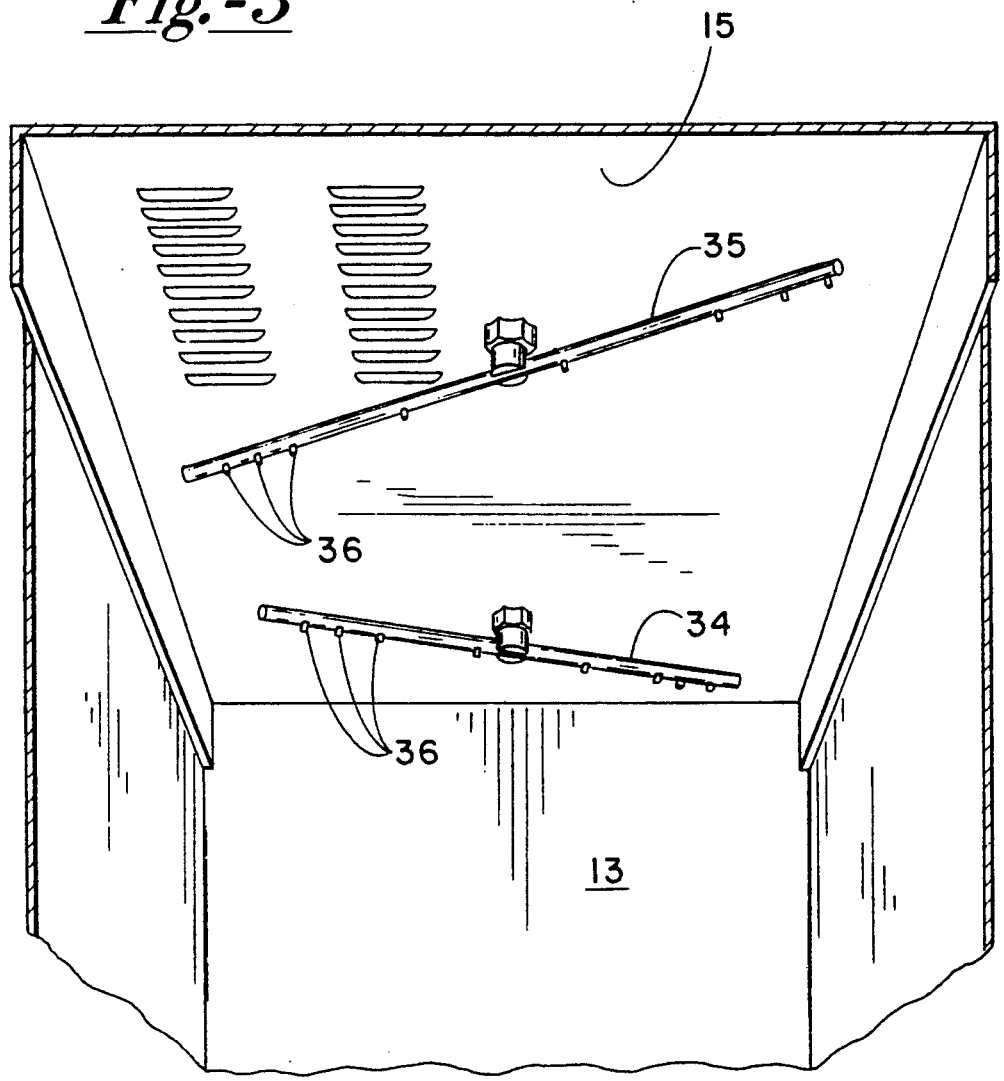
FIG. 3 is a view looking at the interior celing from the doorway end.
Figure 4:
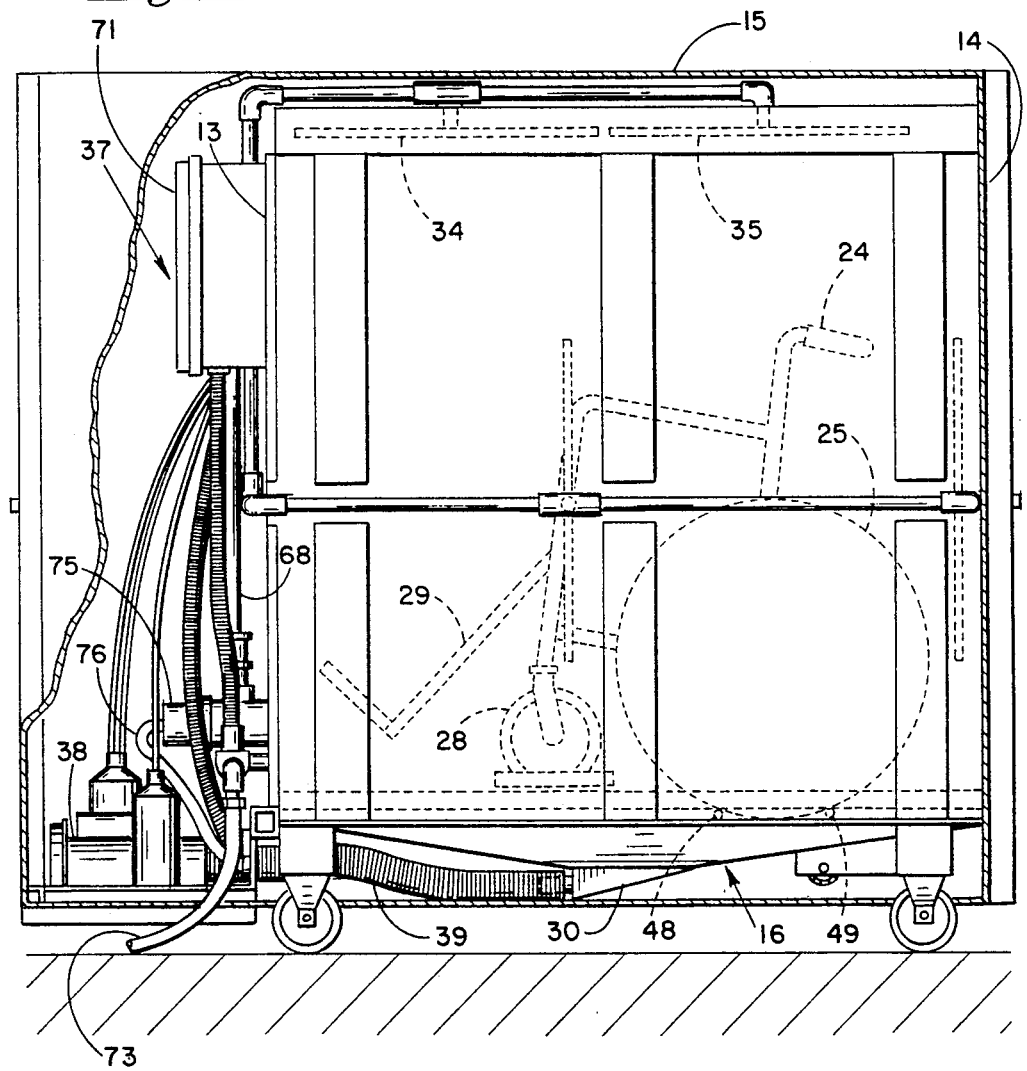
FIG. 4 is a broken-away side elevational view showing the interior of a preferred embodiment of the washer apparatus.
Figure 6:
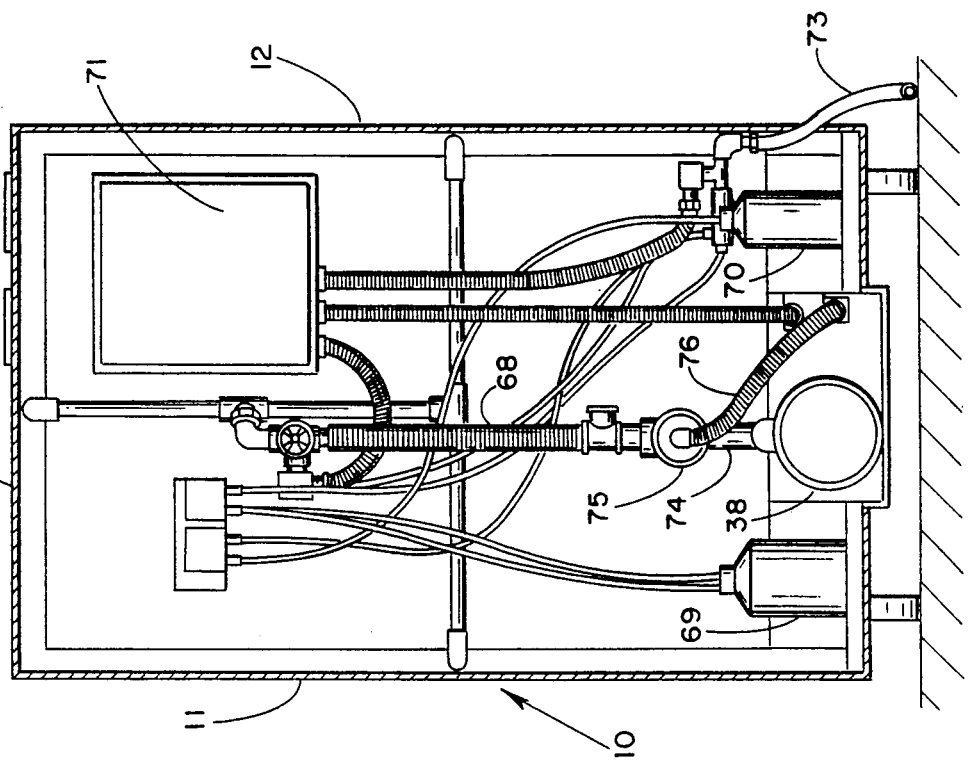
FIG. 6 is an elevational view of the opposite end.
Figure 5:
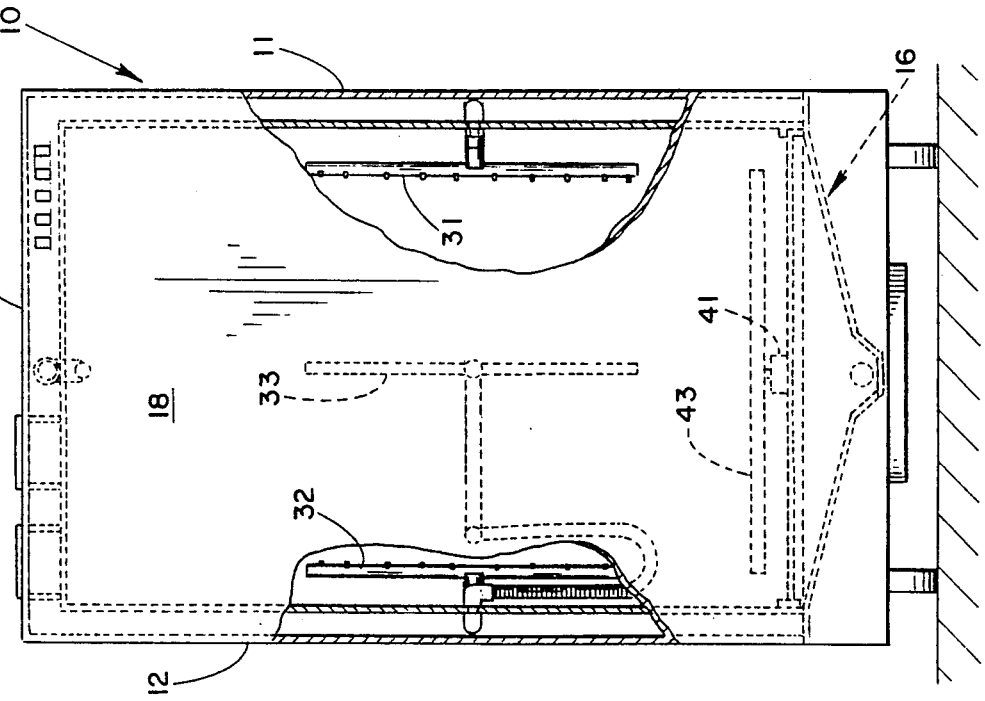
FIG. 5 is an elevational view of the doorway end.

Referring to FIG. 2, a float switch 66 is located on the floor 16 of the washer apparatus. This is a conventional float switch which is used to measure the level of fluid in the washing chamber and in conventional fashion closes (and/or opens) an electrical circuit when the fluid gathering on the floor of the washing chamber reaches a prescribed level. Float switch 66 serves a two-fold purpose. For one, it works in conjunction with pump 38 to prevent the latter from operating until there is sufficient fluid in the system so that the pump will not cavitate. The other is to measure the amount of fluid, for the most part water, which is fed into the chamber and when it reaches the amount deemed necessary to do an adequate cleaning job, it stops further water or fluid input and the pump 38 operates to circulate that fluid during the washing cycle, thereby conserving the use of water.

In a typical cleaning operation a wheelchair 20 is inserted into the washing chamber by tilting the wheelchair backwards and moving the chair slightly forward until wheels 28 enter through the doorway 17 and rest in the frames 46. Then the wheelchair is lifted at the rear, so that the wheels 25 are raised off the ground, while still pushing the wheelchair forward so that rack 43 slides or glides on rail 41 into the washing chamber until wheels 25 are between and rest on rods 56 and on the scouring pads 55. Door 18 is then closed. Under suitable controls and a manually operated switch, not shown, water, usually hot water, is fed into the chamber from a suitable source such as a tank or the like, not shown, via hose 73 through opening 67 located near the bottom of wall 13. A suitable cleaning and/or sanitizing ingredient may be inserted during the beginning of or before the wash cycle begins. When float switch 66 determines that a suitable quantity of cleaning fluid is now in the chamber it operates to energize pump 38 and also to activate a solenoid valve, not identified, to close off the feeding of any more water through opening 67. Pump 38 takes the water out of the washing chamber through sump 30 and conduit 39 and feeds the water through pipe or hose 74 and filter 75 to conduit 68 where it branches out to other conduits within the walls, the ceiling and the door of the washer to the washer arms and their nozzles to provide a suitable spray of fluid onto the wheelchair 20. A wash and/or sanitizing agent is contained in a bottle or other container 69 and may be pumped in a conventional fashion to mix with the hot water. An external drive motor, not shown, rotates rollers 48 and 49 which in turn frictionally rotate wheels 25 so that they are washed by the scouring pads 55 and the applied sprays. The rotating washer arms, the angled nozzles, the rotating wheels and the location of the wheelchair combine to assure a thorough cleaning of the entire wheelchair. At the end of the wash cycle, which is a prescribed time as preset by an electronic timer contained in box 71, other control circuits in box 71 operate solenoids, not identified, to stop the recirculation and pump the fluie from sump 30 through filter 75 and hose 76 to be discarded or recycled. Another float, not shown, is located within or closely adjacent the sump to signal that all of the washing fluid has been pumped out of the chamber. Then the control circuits turn off the pump and operate solenoids to allow rinse water to be fed into the washing chamber through opening 67 via hose 73. A suitable rinsing agent in container 70 may be added. When the rinsing fluid reaches a suitable level, float switch 66 re-energizes pump 38 to recirculate the rinsing fluid and apply it to the wheelchair in the cleaning chamber via the washer arms and nozzles in the same fashion as the washing fluid. The wheelchair wheels 25 are also rotated during the rinse cycle. When the end of the prescribed rinsing period is reached as determined by an electronic timer in box 71, the controls turn off pump 38 and, after a short period of time to allow some fluid to drip off, the wheelchair can be removed from the chamber generally in a manner which is the reverse of that described for inserting the wheelchair into the chamber. It has been found in many instances that the rinsing fluid, if a suitable rinsing agent is used, from one wash operation can be used as the cleaning fluid, with suitable cleaning and sanitizing agent added, for the next subsequent wash cycle of the washer apparatus. This is another significant conservation of water achieved by the instant washer apparatus.

A feature of the invention is the arrangement of the floor of the washer apparatus. A shallow-sloped floor would result in the need for more cleaning and rinsing liquid than would be the case with a steeply-sloped floor for preventing the motor from cavitating. However, if the floor is sloped too severely, the rack for holding the wheelchair would have to be elevated such that placing the wheelchair into the chamber becomes quite difficult. The instant invention provides for an optimum trade-off so that the floor slope is such that the cleaning and rinsing fluids are kept at a conservative level while the chair-holding rack is kept at a convenient level.

We claim:

1. A washer for cleaning a conventional wheelchair, said wheelchair having a large diameter support and propulsion wheel on each side of a seat and a pair of small diameter guide wheels forward of the seat and below the level of the seat, said washer comprising:
   a) and enclosed washing chamber suitable for holding a conventional wheelchair, said chamber defined by end walls, side walls, a floor and a ceiling and having a doorway in one wall through which a wheelchair can be placed in and removed from the chamber;
   b) a sump in said floor, said chamber floor being slanted to drain liquid to said sump;
   c) means for supporting a conventional wheelchair elevated above said floor in said washing chamber for exposing the underside of said wheelchair and the entire area of the wheelchair wheels to cleaning and rinsing liquid;
   d) elongated tubular liquid spray arms rotatably mounted on walls and the ceiling of said chamber, said spray arms having a series of nozzles spaced apart lengthwise on said spray arms, said nozzles angled to apply liquid onto all parts of a conventional wheelchair supported by said wheelchair supporting means including the underside of the wheelchair, the entire seating surface area of the wheelchair seat and the wheelchair wheels;
   e) means for feeding cleaning and rinsing liquid to said spray arms for rotating said spray arms and for providing said liquid to said nozzles;
   f) said means for supporting a conventional wheelchair including a rack having frame means for holding the front small diameter guide wheels of a conventional wheelchair to prevent the wheelchair from moving while being washed and roller means, the large diameter support and propulsion wheels of a conventional wheelchair resting on said roller means; and
   g) means for rotating said roller means for rotating said large diameter wheelchair wheels while liquid is applied to said wheels.

2. The wheelchair washer as described in claim 1 further including means for moving said frame means into and out of said washing chamber.

* * * * *